United States Patent
Cicchetti et al.

(10) Patent No.: US 7,809,960 B2
(45) Date of Patent: *Oct. 5, 2010

(54) NETWORK TAP DEVICE POWERED BY POWER OVER ETHERNET

(76) Inventors: Christopher J. Cicchetti, 2147 Avy Ave., Menlo Park, CA (US) 94025; Arthur M. Lawson, 1385 James Ct., Morgan Hill, CA (US) 95037; Greta L. Light, 19534 Vineyard La., San Mateo, CA (US) 95070-4556; Paul Gentieu, 395 E. Evelyn Ave., #236, Sunnyvale, CA (US) 94086; Timothy M. Beyers, 1025 Hampshire St., Apt. B, San Francisco, CA (US) 94110; Donald A. Blackwell, 19534 Vineyard La., Saratoga, CA (US) 95070-4556

( * ) Notice: Subject to any disclaimer, the term of this patent is extended or adjusted under 35 U.S.C. 154(b) by 674 days.

This patent is subject to a terminal disclaimer.

(21) Appl. No.: 11/421,361

(22) Filed: May 31, 2006

(65) Prior Publication Data

US 2007/0081553 A1     Apr. 12, 2007

Related U.S. Application Data

(60) Provisional application No. 60/726,120, filed on Oct. 12, 2005.

(51) Int. Cl.
*H04L 12/66* (2006.01)
*G05D 7/03* (2006.01)

(52) U.S. Cl. ........................ 713/300; 700/286

(58) Field of Classification Search ................ 370/241, 370/241.1, 247, 252, 254; 700/286, 295, 700/297; 713/300

See application file for complete search history.

(56) References Cited

U.S. PATENT DOCUMENTS

| | | |
|---|---|---|
| 6,785,908 B1 | 8/2004 | Kamiya |
| 6,816,590 B2 | 11/2004 | Pike et al. |
| 6,868,069 B2 | 3/2005 | Knobbe et al. |

(Continued)

FOREIGN PATENT DOCUMENTS

WO     2007/059509 A2     5/2007

OTHER PUBLICATIONS

Texas Instruments, "Integrated 100-V IEEE 802.3af PD and DC/DC Controller," SLV5590A, Aug. 2005, 38 pages.

(Continued)

*Primary Examiner*—Seema S Rao
*Assistant Examiner*—Mon Cheri S Davenport

(57) ABSTRACT

A network tap device that is configured for operation in a copper Gigabit Ethernet communications network using a power-over-Ethernet ("POE") electrical supply is disclosed. In one embodiment, a network tap device powered by a POE supply is disclosed, comprising first and second network ports that are configured with receptacles for receiving communication cables. The communication cables are configured to carry both data signals and the POE supply to and from the network tap device. The network tap device further includes first and second tap ports that connect with additional communication cables to a monitoring device. The network tap device also includes control and regulation circuitry that is configured to receive the POE supply from the communication cables via the network ports and to enable components of the network tap device to be operated by the POE supply.

26 Claims, 4 Drawing Sheets

U.S. PATENT DOCUMENTS

| | | |
|---|---|---|
| 7,373,528 B2 | 5/2008 | Schindler |
| 7,548,515 B2 | 6/2009 | Walsh |
| 7,561,517 B2 | 7/2009 | Klinker et al. |
| 2003/0072438 A1 | 4/2003 | Le Creff et al. |
| 2004/0120259 A1* | 6/2004 | Jones et al. ............... 370/250 |
| 2004/0215832 A1 | 10/2004 | Gordy et al. |
| 2004/0228090 A1 | 11/2004 | Blackwell |
| 2005/0041684 A1 | 2/2005 | Reynolds |
| 2005/0071711 A1 | 3/2005 | Shaw |
| 2005/0129033 A1 | 6/2005 | Gordy et al. |
| 2005/0147082 A1 | 7/2005 | Keddy et al. |
| 2005/0222815 A1 | 10/2005 | Tolly |
| 2005/0257262 A1* | 11/2005 | Matityahu et al. ............ 726/22 |
| 2005/0281326 A1* | 12/2005 | Yu ............................. 375/222 |
| 2006/0063509 A1 | 3/2006 | Pincu et al. |
| 2006/0153092 A1* | 7/2006 | Matityahu et al. .......... 370/252 |
| 2006/0233115 A1* | 10/2006 | Matityahu et al. .......... 370/252 |
| 2007/0171966 A1 | 7/2007 | Light et al. |
| 2007/0174492 A1 | 7/2007 | Light et al. |
| 2007/0253349 A1 | 11/2007 | Light et al. |
| 2008/0013467 A1 | 1/2008 | Light et al. |
| 2008/0014879 A1 | 1/2008 | Light et al. |

OTHER PUBLICATIONS

Texas Instruments, "10-W Power-Over-Ethernet Isolated Power Module Assembly," SLT5224B, Jul. 2004, 11 pages.

U.S. Appl. No. 11/421,372, filed May 31, 2006, Christopher J. Cicchetti, et al.

Office Action, U.S. Appl. No. 11/421,372, mailed Feb. 4, 2009.

Office Action, U.S. Appl. No. 11/560,341, mailed Aug. 20, 2009.

Office Action, U.S. Appl. No. 11/776,286, mailed Oct. 1, 2009.

Final Office Action, U.S. Appl. No. 11/421,372, mailed Oct. 26, 2009.

Office Action, U.S. Appl. No. 11/421,372, mailed Jan. 29, 2010.

Notice of Allowance, U.S. Appl. No. 11/776,286, mailed Feb. 17, 2010.

* cited by examiner

NETWORK TAP DEVICE POWERED BY POWER OVER ETHERNET

CROSS-REFERENCE TO RELATED APPLICATIONS

This application claims the benefit of the U.S. Provisional Patent Application No. 60/726,120, filed Oct. 12, 2005, and entitled "Network Tap Configured for Power over Ethernet Operation," which is incorporated herein by reference in its entirety.

BACKGROUND OF THE INVENTION

1. Field of the Invention

Exemplary embodiments of the invention generally relate to a network tap and associated devices, hardware and software, that are configured for Power Over Ethernet ("POE") based operation.

2. Related Technology

The dependence upon the use of data networks to transmit and receive data at high data rates has led to a corresponding interest in the ability to perform real-time monitoring and analysis of that data, or network traffic, so that performance of the network can be evaluated, and problems identified and resolved. Such data monitoring and analysis necessitates the ability to access the network data stream without disrupting data transmission and the operation of the network.

To this end, hardware devices known as "network taps" are employed and configured such that network data can be captured for analysis without interrupting operation of the network. In general, network taps receive a stream of network data and make a copy of the data while allowing the original stream to pass through to its destination. The copied data is forwarded to a network analyzer or other monitoring device for evaluation. This is typically a real time process that continually occurs while the network tap is operating.

While network taps have generally proven useful in enabling the monitoring and analysis of network traffic, significant problems remain with typical network taps. One problem of particular concern is that network taps typically require an external power source for operation. Because the network tap relies on an external power source, an interruption of power to the network tap generally results in a corresponding interruption in data flow through the network. Even a very short term interruption in power to the network tap will force a typical data network as a whole to re-initialize, often using complex auto-negotiation and discovery algorithms. This initialization process can take from a few seconds to several minutes, depending on the network topology. As a result, an interruption of power to the network tap can severely impair operation of the entire data network.

Thus, the external power supply to the network tap is a significant failure point in the system. Unfortunately, disconnection of such external power supplies is a relatively common occurrence. In many cases, disconnection of the external power supply to the network tap occurs because the network tap and power supply are located in a place where personnel may inadvertently, or mistakenly, unplug the power supply. As noted above, this lack of fault tolerance in many high speed data communication networks is a major concern that remains largely unaddressed.

BRIEF SUMMARY

The present invention has been developed in response to the above and other needs in the art. Briefly summarized, embodiments of the present invention are directed to a network tap device that is configured for operation in a copper Gigabit Ethernet communications network using a power-over-Ethernet ("POE") electrical supply. Powering of the network tap in this manner eliminates a potential network stream data failure point, such as when a traditional external power supply (e.g., converted AC power supply from a wall outlet) is used to power the tap. Interruption of this traditional external power supply during tap operation can interrupt the data stream passing through the tap, which as described above, can significantly impair operation of the network. Further, elimination of the power cord used to provide the traditional power supply to the network tap precludes the possibility of the power supply being interrupted as a result of a person tripping over the cord and unplugging the unit from the power outlet or from failure of the external power supply. Elimination of this failure point in turn contributes to a relative improvement in the reliability and operation of the network.

In one embodiment, a network tap device powered by a POE supply is disclosed, comprising first and second network ports that are configured with receptacles for receiving communication cables. The communication cables are configured to carry both data signals and the POE supply to and from the network tap device. The network tap device further includes first and second tap ports that connect with additional communication cables to a monitoring device. The network tap device also includes control and regulation circuitry that is configured to receive the POE supply from the communication cables via the network ports and to enable components of the network tap device to be operated by the POE supply.

In addition, the POE network tap device can be configured to provide POE power to other components that are operably connected to the TAP, thereby acting as a pass-through POE source and extending the capability of the network in which the tap is located. Moreover, it is a consequence of employment of embodiments of the POE network tap that because the POE network tap obtains its power from the network, the POE tap fails only as a result of failure of the network device to which it is connected. This is in contrast with the use of more conventional network taps, where the tap can fail as a result of failure of its external power supply. Advantageously, powering of the POE tap by a POE power supply offers enhanced flexibility for POE tap placement, as it can be positioned wherever a network port is present, without regard to a traditional wall outlet.

These and other features of the present invention will become more fully apparent from the following description and appended claims, or may be learned by the practice of the invention as set forth hereinafter.

DETAILED DESCRIPTION

Reference will now be made to figures wherein like structures will be provided with like reference designations. It is understood that the drawings are diagrammatic and schematic representations of exemplary embodiments of the invention, and are not limiting of the present invention nor are they necessarily drawn to scale.

FIGS. 1-3D depict various features of embodiments of the present invention, which is generally directed to a "POE" network tap that is configured for operation using a power-over-Ethernet ("POE") electrical supply. Powering of the network tap in this manner eliminates a potential network stream data failure point, such as when a traditional external power supply (e.g., converted AC power supply from a wall outlet) is used to power the tap. Termination of this traditional external power supply during tap operation can interrupt the data stream passing through the tap, which as described above, can significantly compromise data stream integrity. Further, elimination of the power cord used to provide the traditional power supply to the network tap precludes the possibility of the power supply being interrupted as a result of a person tripping over the cord and unplugging the unit from the power outlet. Elimination of this failure point in turn contributes to a relative improvement in the reliability and operation of the network.

In addition, the POE network tap can be configured to provide POE power to other components that are operably connected to the TAP, thereby acting as a pass-through POE source and extending the capability of the network in which the tap is located. Moreover, it is a consequence of employment of embodiments of the POE network tap that because the POE network tap obtains its power from the network, the POE tap fails only as a result of failure of the network device to which it is connected. This is in contrast with the use of more conventional network taps, where the tap can fail as a result of failure of its external power supply. Advantageously, powering of the POE tap by a POE power supply offers enhanced flexibility for POE tap placement, as it can be positioned wherever a network port is present, without regard to a traditional wall outlet.

As the foregoing suggests, power for operation of the network tap is provided by the Ethernet data and power network with which the tap is connected. One example of such a POE network tap is configured for use with a copper Ethernet network operating at one or more of a variety of Ethernet data rates, including, but not limited to, 10/100/1000 Mbit/sec., or even higher rates. More generally however, embodiments of the invention are suited for operation with any network where both power and data are carried over the network lines. Accordingly, the scope of the invention should not be construed to be limited to any specific network type or data rate.

Figure 1:
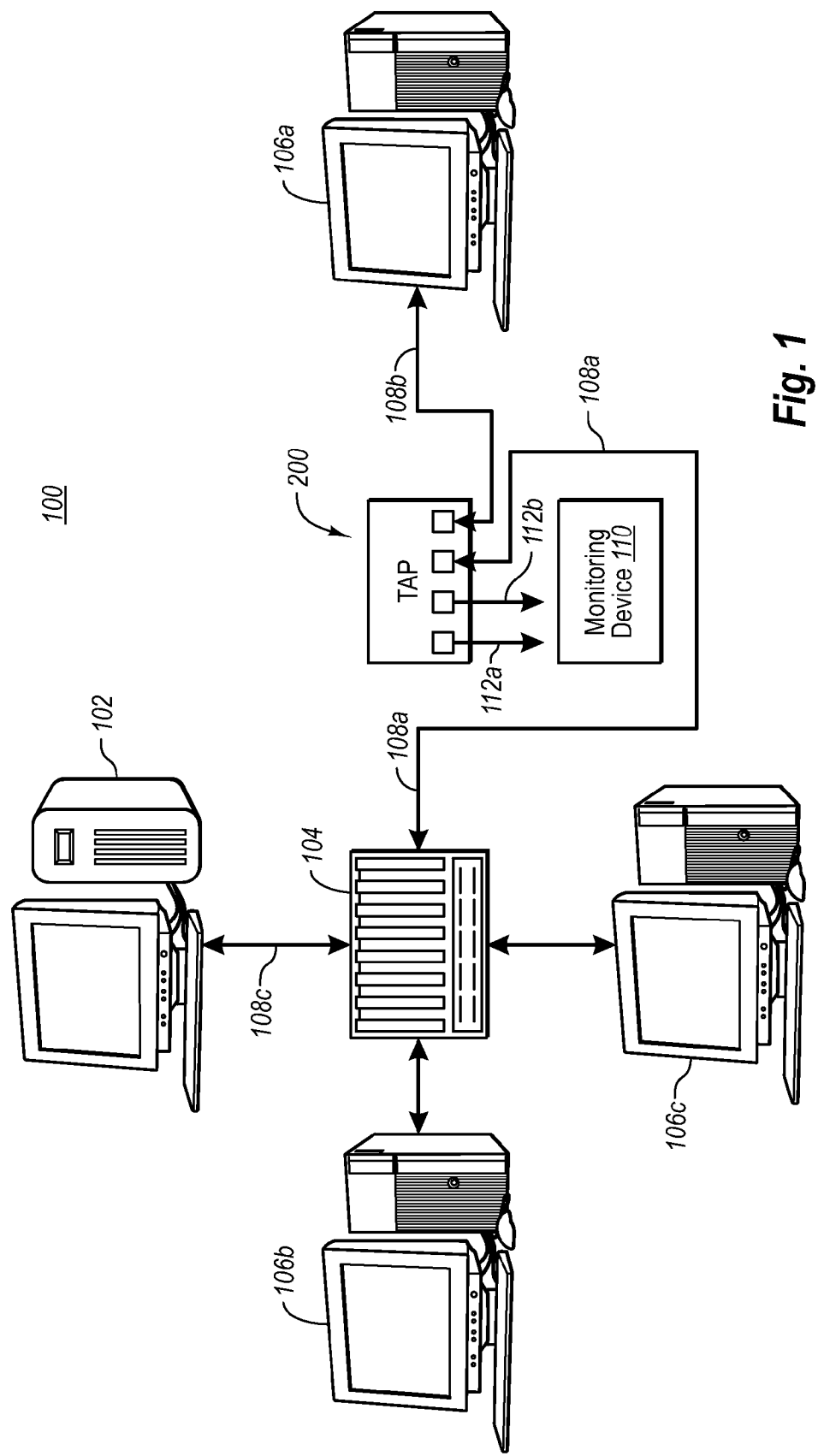
FIG. 1 is a simplified view of an exemplary environment in which embodiments of the present invention can be practiced.

Reference is first made to FIG. 1, which depicts one example of an operating environment in which a POE network tap can be utilized, in accordance with one exemplary embodiment of the present invention. In particular, FIG. 1 shows a block diagram of a communications network, or computer network 100, including a POE network tap device ("POE tap"), generally designated at 200, in accordance with one embodiment of the present invention. Although computer network 100 was selected to illustrate the present invention, any computer network topology can be used with the present invention, including but not limited to various combinations of network servers, switches, routers, hubs and various end user computers/terminals. Indeed, various modifications to both the POE network tap and its operating environment can be realized while still residing within the scope of the present claimed invention. Hereinafter, individual elements forming a group of like elements may also be referred to by a letter designation.

In greater detail, the computer network 100 generally includes a network server 102, a network switch 104 (e.g., a router), desktop computers 106, and POE tap 200. The network server 102, the desktop computers 106b,c and the POE tap 200 are coupled directly to the network switch 104. The POE tap 200 is coupled between the network switch 104 and the desktop computer 106a via cables 108a,b. The POE tap 200 is further coupled to a monitoring device 110 via cables 112a,b. For Gigabit Ethernet, the cables 108 and 112 are typically four-pair CAT 5 twisted-pair cables, but the POE tap 200 can also work with 10BASE-T and 100BASE-T Ethernet systems, which typically use Category 3 (CAT 3) cables, or with other suitable transmission lines. The POE tap 200 can be programmed to operate with multiple Ethernet speeds and cables using an onboard microprocessor, discussed further below, or by setting jumpers and/or switches in the POE tap.

The term "monitoring device" as used herein is understood to include a network analyzer or other diagnostic equipment, intrusion detection system, or any other device used to monitor and/or analyze the operational status of a computer network segment.

In a typical network session, the desktop computer 106a requests from the network server 102 a file containing information needed by an application program executing on the desktop computer 106a. The desktop computer 106a issues a request to the network server 102, which propagates through the POE tap 200 to the network switch 104 via cables 108a, b. The network switch 104 reviews the destination address of the request and routes it to the network server 102 via cable 108c. The network server 102 responds with the requested data. The requested data is sent from the network server 102 to the network switch 104 via cable 108c. The network switch 104 routes the data to the desktop computer 106a via the POE tap 200 and cables 108a, b.

To view the request made by the desktop computer 106a and response made by the network server 102, the POE tap 200 is physically connected between the network switch 104 and desktop computer 106a. Full-duplex data flows simultaneously in both directions over the cables 108. In the present embodiment, the POE tap 200 provides an independent copy, via the cables 112a, b, of the data flowing in either direction to the monitoring device 110. For example, a request from the desktop computer 106a travels through the network switch 104 to network server 102, and is tapped and sent out a tap port of the POE tap 200 over cable 112a to the monitoring device 110. Likewise, data returning from the network server 102 is tapped and sent out another monitoring port of the POE tap 200 over cable 112b to the monitoring device 110.

Although FIG. 1 shows a single POE tap device deployed in the computer network 100, the present invention is not limited to a single tap device, and one or more tap devices can be inserted in various segments of a computer network. Also, each tap device can have two or more network ports for receiving bi-directional traffic. Multiple tap devices can be separately configured and controlled or coupled together (e.g., daisy-chained) and commonly controlled by a central computer or network analyzer.

Figure 2:
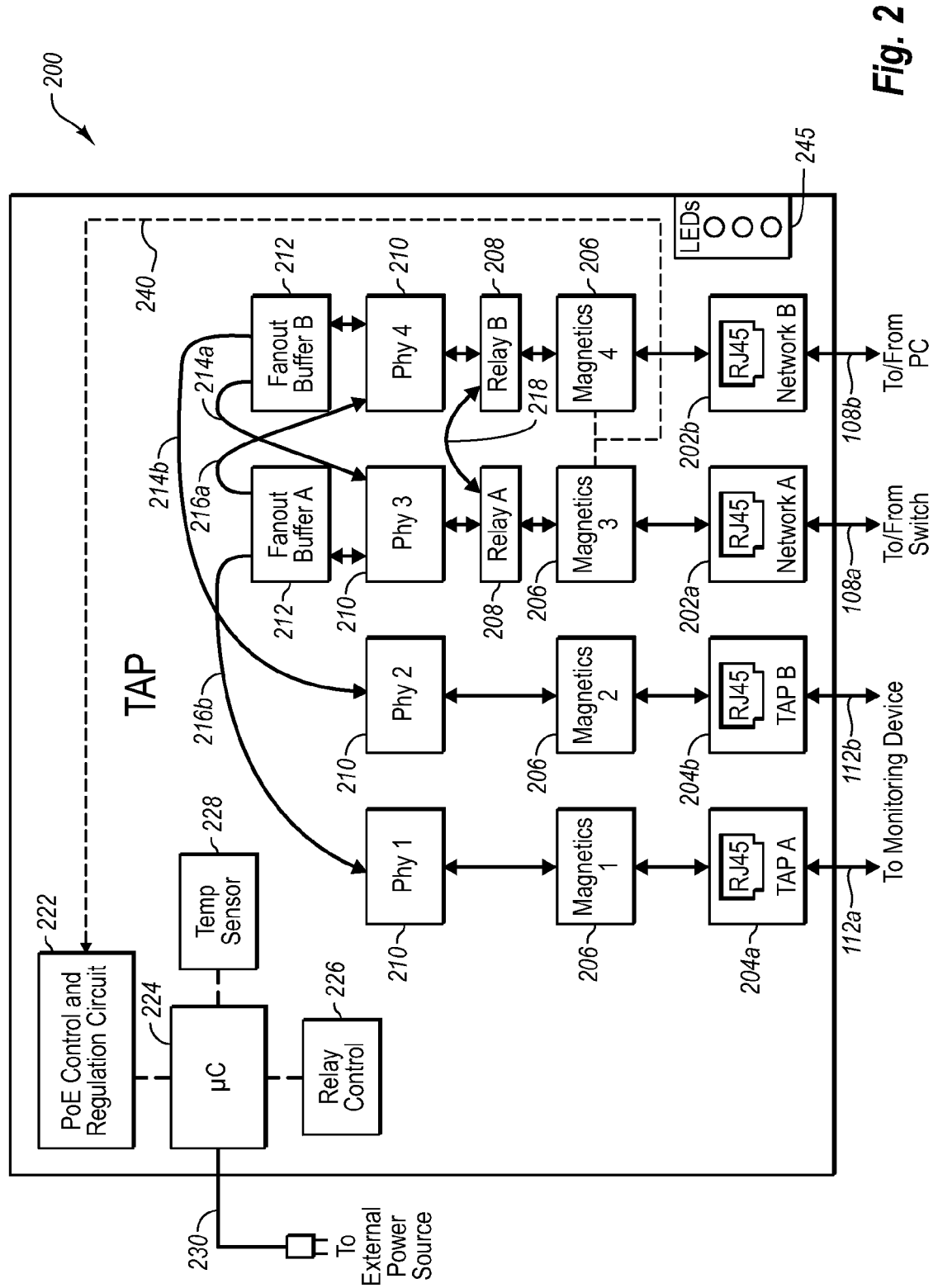
FIG. 2 is a perspective view of a network tap powered by the power-over-Ethernet standard, according to one example embodiment.

Reference is now made to FIG. 2 in describing various internal and other features of the POE tap 200 in greater detail. Specifically, the POE tap 200 includes various ports for receiving and transmitting data to and from network components, as depicted in FIG. 1. Two network ports 202a and 202b, also referred to herein as "network A" and "network B" ports, are configured to couple with cables 108a and 108b of the network 100 of FIG. 1, thereby interlinking the POE tap 200 with the network. Similarly, two tap ports 204a and 204b, also referred to herein as "tap A" and "tapB" ports, are configured to couple with cables 112a and 112b (FIG. 1), thereby linking the POE tap 200 to the monitoring device 110. Each of the ports 202 and 204 is configured to receive an RJ-45 plug of the respective cable 108 or 112, typical of Ethernet-based networks, though other port/plug configurations could be alternatively used. Thus, in the case of cat-5 cables 108a and 108b, four twisted pairs of each cable create eight total conductors that interconnect with terminals in the network ports A and B, thereby electrically connecting each cable with the POE tap 200. As explained herein, the ports 202, 204 enable both data signals and POE signals to enter and depart the POE tap 200, as will be described further below.

A series of magnetics modules 206, also referred to herein as "magnetics 1," "magnetics 2," "magnetics 3," and "magnetics 4," are operably connected to a respective one of the ports 202, 204, one magnetics for each port. Each of the magnetics 206 performs signal isolation functions for the respective data signal passing through the magnetics during tap operation.

Two mechanical relays 208, individually referred to herein as "relay A" and "relay B," are operably connected to the magnetics 3 and 4 of the magnetics 206. The relays 208 are employed to selectively divert data signals passing through the POE tap 200 according to operating status of the tap. For instance, when the tap is operating, the relays 208 connect the data signals from ports 202a, b to phy modules, described below, in accordance with tap operation. However, should operation of the POE tap 200 be interrupted due to power loss or other fault, the relays 208 close, and any data signals received from network port A are diverted by relay A to relay B via a signal path 218 and out the network port B via magnetics 4. Likewise data signals received from network port B during tap interruption are diverted by relay B to relay A via the signal path 218 and out the network port A via magnetics 3. Note that this interconnection necessarily passes the data signals through the magnetics modules 3 and 4, which adds some signal attenuation, but enables the creation of a direct electrical connection between the network ports A and B. This in turn enables the network link to remain up even if the POE tap loses power.

A series of phy modules 210, individually referred to herein as "phy 1," "phy 2," "phy 3," and "phy 4," are each operably connected to the previous described components. In particular, phy 3 and phy 4 of the phys 210 are operably connected to relay A and relay B of the relays 208, respectively, while phy1 and phy 2 are each operably connected to magnetics 1 and magnetics 2 of the magnetics 206, respectively. So configured, each of the phys 1-4 is at least indirectly operably connected to the similarly numbered one of the magnetics 1-4. "Phy" is a contraction for the term "physical layer device." The phys 210 represent integrated circuitry or functional blocks that provide physical access to the data stream. The phys 210 are further configured to receive a data signal and convert it to a particular data format. For instance, in one embodiment phys 3 and 4 receive data signals from the magnetics 3 and 4 in a 1000BASE-T signal format, used with Category 5 copper cabling, and convert the signals to 1000BASE-X serial signals in preparation for later use. Similarly, 1000BASE-X data signals that are received by the phys 1-4 in the reverse direction are converted by the respective phy into 1000BASE-T signals for retransmission onto one of the copper cables 108 and 112. In other embodiments, different data formatting conversions can be performed by the phys 210 as may be needed for a particular application. One exemplary data conversion could be from PAN-5 to SGMII format. Thus, data received by the phys 1-4 are converted as needed for further use by the POE tap 200 or other downline components.

Fanout buffers 212, individually referred to herein as "fanout buffer A" and "fanout buffer B," are provided as to be operably coupled to phy 3 and phy 4, respectively. Each fanout buffer A and B is configured to receive a data signal, such as a 1000BASE-X serial signal, from the respective phy and replicate the data signal so as to produce a duplicate copy thereof. The duplicate data signals are then forwarded via transmission lines, as will be explained. Thus in one embodiment, each fanout buffer A and B is configured to receive a differential data signal from phy 3 and phy 4, respectively, and to duplicate the signal. In the case of fanout buffer B, one of duplicated signal streams is forwarded via transmission path 214a, while the other stream is forwarded via transmission path 214b. Likewise, fanout buffer A forwards its duplicated data streams via transmission paths 216a and 216b.

In the case of fanout buffer B, the 1000BASE-X duplicate data stream carried by the transmission path 214a is forwarded to phy 3 where it is converted back to 1000BASE-T format before being transmitted through the relay A, magnetics 3, and out of the POE tap 200 via the network A port 202a. In contrast, the 1000BASE-X data stream carried by the transmission path 214b is forwarded to phy 2, where it is converted back to 1000BASE-T format before being transmitted through the magnetics 2 and out of the POE tap 200 via the tap B port 204b.

Fanout buffer A operates similar to that described above with respect to fanout buffer B, wherein the duplicate data streams created by the buffer and carried on the transmission paths 216a and 216b are distributed to phy 4 and phy 1, respectively, to exit the POE tap 200 via network B port 202b, and tap A port 204a. In this way, bidirectional data signals can be received by the POE tap 200 via network ports A and B, conditioned, duplicated, and redirected to the monitoring device via tap ports A and B and cables 112a and b, all while preserving the original intended path of the data signals by enabling the signals to continue their transit on the computer network by exiting the device at one of the network ports A or B. Thus, exact copies of the data signals are sent to two different destinations, thereby enabling the POE tap to divert data to the monitoring device without interrupting the flow of network traffic.

Note that the components discussed above are "operably connected" to one another when data signals are able to pass from one component to the other. These connections are indicated in FIG. 2 by the arrows drawn between the various components.

Continued reference is made to FIGS. 1 and 2. In accordance with one embodiment, the POE tap 200 is configured to be powered via an electrical supply provided by the power-over-Ethernet ("POE") standard. POE power supplies are provided over selected pairs of wires of a cat-5 or other suitable cable with which the POE tap may be connected. In the embodiment illustrated in FIGS. 1 and 2, the POE electrical power supply ("POE" supply") can be provided by one or both of the cables 108a and 108b to the POE tap 200. Provision of an electrical supply to the POE tap in this manner obviates the need for a more traditional external power supply source, such as use of a standard wall outlet, which is undesirable for the reasons outlined further above.

In greater detail, the POE supply is provided to the POE tap 200 via one or both of the cables 108a,b that are received by and operably connected to the network ports A and B. In one embodiment, the cables are of cat-5 type, each cable having 4 pairs of two wires, equaling 8 wire conductors per cable. In addition to carrying the data signals of the network traffic, the wire pairs can also carry the POE supply according to industry convention. For example, wire pairs 1,2 and 3,6 of each cable can be configured to carry a 48 volt and 0 volt POE supply (at approximately 15-16 watts), respectively, for use by the POE tap. Alternatively, wire pairs 4,5 and 7,8 can be employed to carry the same POE supply. As total power requirements for the POE tap 200 in one embodiment is approximately 6 watts in one embodiment, the POE supply is more than sufficient to enable all tap operations.

Note that the data rate of the data signals carried by the wire pairs of the cables 108*a, b* is independent of the POE supply, and so the data rate can vary without substantially affecting provision by the cable of the POE supply to the POE tap.

In the present embodiment, the POE supply is transmitted via one or more of the cables 108*a, b* and network ports A, B to the magnetics 3 and 4. The POE supply, a 48V supply in one embodiment, appears as a difference in DC voltage between one wire pair of the cat-5 cable and another. The DC voltages of each wire pair are accessed at the center taps, i.e., the midpoints of the primary transformer windings, of each magnetics module, and passed to the POE control and regulation circuitry ("regulation circuitry") 222 over POE transmission path 240. The regulation circuitry 222 is configured as a switching power supply that converts the POE supply voltage to other voltages as needed for use by the various components of the POE tap 200, as described above. The regulation circuitry can further be configured to control distribution of the POE supply to the various POE network tap components contained therein. One example of such circuitry is the PTB48540 Series POE Isolated Power Module Assembly, manufactured by Texas Instruments. Another example of circuitry that can provide POE control and regulation is the TPS23750 and TPS23770 Integrated 100-V IEEE 802.3af PD and DC/DC Controller manufactured by Texas Instruments. Of course, other POE power modules of comparable functionality may alternatively be employed.

The POE supply can be provided by one or both network ports A and B, assuming both ports are configured for supplying the POE electrical supply. If both network ports A and B are so configured, they together form redundant power supply sources such that if a POE supply from one port fails, a POE supply can still be supplied by the other network port. In this case, the regulation circuitry can be configured to regulate POE from one or both ports, and can include additional circuitry to perform switchover from one POE supply to the other as needed.

Further, exemplary embodiments of the invention include a microcontroller 224 that is programmed to monitor and control the operation of the POE tap 200. In general, the microcontroller 224 includes various components, including integrated A/D ("Analog to Digital") converter inputs as well as digitally programmable inputs and outputs ("I/O"), and is programmed as desired to enable achievement of desired functions with respect to the operation of the POE network tap. By way of example, the microcontroller 224 is programmed to configure phys 1-4 to perform the data format translation needed for proper operation of the POE tap 200. Generally, the microcontroller 224 can include internal diagnostic circuitry that enables the POE tap 200 to identify and report faults in the operation of the tap and/or with regard to operation of the computer network 100 with which the POE tap is connected. In some embodiments, the diagnostic circuitry of the microcontroller 224 also provides the capability for the POE tap 200 to resolve identified faults. Some embodiments of the invention include indicators, such as LED visual indicators 245, that operate in connection with the diagnostic circuitry to provide a user with information concerning the operational status and condition of the POE tap.

As well, and as suggested earlier, the internal diagnostic circuitry of the microcontroller 224 also implements monitoring functionality. Thus, the microcontroller 224 monitors, and reports on, system parameters such as temperature, voltage, and any other parameters relevant to operation of the POE tap. For instance, when the POE supply is first provided to the POE tap 200 via one or both of the network ports A and B, the microcontroller 224 can sample the POE supply, via its connection with the regulation circuitry 222, to ensure that sufficient supply exists for full operation of the POE tap. The microcontroller 224 also performs an initialization sequence once the power is established. During the initialization sequence, the Phys 1-4 are initialized and, once the microcontroller 224 determines that safe operating conditions exist, the network tapping process can be commenced. The microcontroller 224 then continuously monitors and controls the operation of the network tap.

Exemplarily, the illustrated embodiment of the POE tap 200 includes a relay control 226 that is operably connected to the microcontroller 224. Should it sense that power has been removed from the POE tap, that operating voltages exceed the allowed range, or that some other fault or problem condition exists, the microcontroller 224 can activate the relay control 226 to establish the signal path 218 across the relays A and B so that network traffic can pass through the POE tap unimpeded, thereby preserving the integrity of the data carried in the traffic. The presence of a fault condition can be forwarded to a user interface, such as an LED panel, discussed below, or by other suitable means.

Similarly, FIG. 2 shows that the POE tap 200 includes a temperature sensor 228, operably connected to the microcontroller 224, for monitoring one or more temperature conditions relating to operation of the tap. Should excessive temperature conditions be encountered, the microcontroller 224 can direct corrective measures to be taken so as to prevent damage to the POE tap 200 or interruption of the data stream. The microcontroller 224 can also control operation of any user interface, such as an LED panel, discussed further below.

As mentioned, the microcontroller 224 is configured to monitor operation of the POE tap 200, including monitoring the line status of the data signal streams passing through both network ports A and B by reading, for example, status registers contained in phys 3-4. This information can be communicated to the user via LEDs discussed below, or other visual indicators, or forwarded to a management interface (not shown).

Note that, in one embodiment, the microcontroller is implemented as a processor capable of executing software or microcode. However, the present invention should not be so limited. Indeed, other devices implementing the same functionality can also be employed, including an application-specific integrated circuit ("ASIC").

FIG. 2 further shows the POE tap 200 as including a traditional external power link 230 for plugging into a wall outlet, for instance. Though not required, it may be desirable in some applications for the POE tap to include a redundant power source, such as the external link 230, for backup purpose should the POE functionality fail for some reason. In another embodiment two such redundant external supplies can be provided to the POE tap, if desired.

The POE tap 200 further includes a user interface for allowing the condition and/or operation of the device to be easily ascertained by a technician or user. In the present embodiment, this user interface is implemented as an LED panel 245, containing various LEDs, whose lit status and/or color can indicate various conditions relating to the POE tap device. For instance, in the present embodiment the LED panel 245 includes three LEDs. One LED uses color to indicate the source of the tap's power. For example, a lit green LED indicates that the tap is running on POE power, while a lit orange LED indicates it is running on a backup external supply. The other two LEDs can indicate whether or not a valid link is present on network ports A and B. The LED panel can 245, of course, be configured differently from that described herein.

The POE tap 200, configured as described herein as a copper Gigabit network tap, is enabled by way of embodiments of the present invention, to receive power from one or more Cat-5 media side or other suitable cables according the Power-over-Ethernet (IEEE 802.3af) standard. This removes the possibility of the POE tap failing due to a separate power supply connected to the network tap. In various designs the POE tap may use power solely from POE. Alternatively, the tap may use POE as a primary electrical supply source with a traditional, external power supply as a redundant electrical source, or vice-versa. As a network tap must often be the most reliable item in an Ethernet link, eliminating the point of failure of a network tap due to traditional external power supplies is of primary concern. A POE tap configured according to embodiments of the present invention can therefore benefit from one or more upstream/downstream switches, computers, servers, or other POE supply providers—also referred to herein as "power sourcing equipment ("PSE")—to provide power. In one embodiment, the PSE source is also the same device that is providing the data signal stream to the POE tap.

Note that, as a result of providing a power supply to the network tap of embodiment of the present invention via POE, the possibility of interruption of the data stream passing through the tap as a result of the tap losing power is reduced. This is so because interruption of the POE supply to the POE tap would most likely be caused by the failure of the upstream component in the network that is most likely also providing the POE supply to the POE tap, which component would itself cause the data to be interrupted. Thus, any interruption of POE supply would correspond with interruption of the data stream by another component, and not through the fault of the POE tap.

Reference is now generally made to FIGS. 3A-3D in describing various possible configurations of the POE tap, according to various embodiments of the present invention. Note that these embodiments are exemplary, and that yet other configurations could be employed while still residing within the scope of the present invention. Note also that the POE supplies shown entering and exiting the POE tap 200 are understood to be carried via cables, such as those shown at 108 and 112 in FIG. 1, though they are not shown in these figures. Note also that only POE supplies are shown not the data signal streams explained above that are also received and transmitted by the POE tap 200.

Figure 3A:
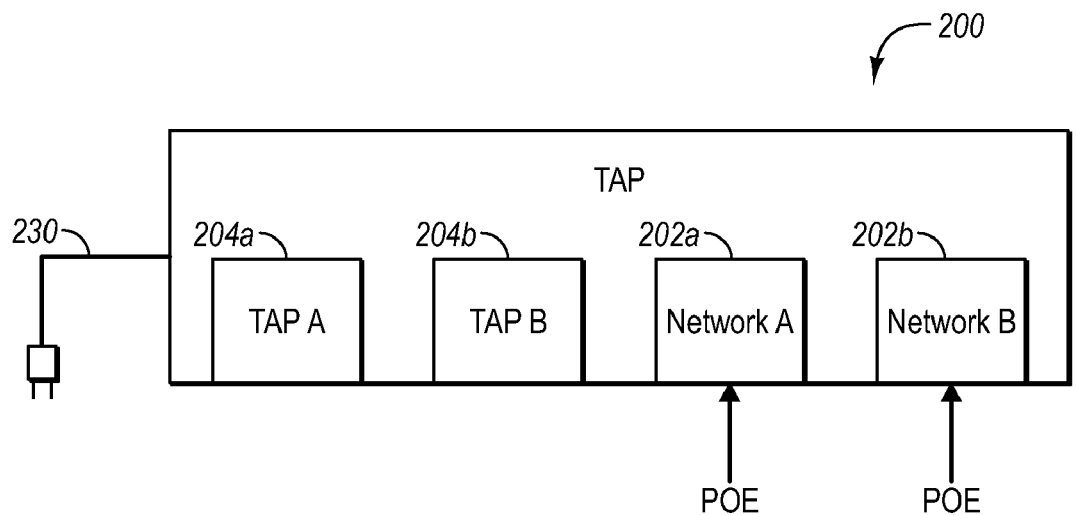
FIGS. 3A-3D are simplified block diagrams of possible power-over-Ethernet configurations using a network tap, according to alternative embodiments of the present invention.

In particular, FIG. 3A is a simplified view of the configuration discussed above in connection with FIG. 2, wherein the POE supply is provided via one or both data cables that plug into the network ports A and B (202A, 202b), for operation of the POE tap 200. Note that it is sufficient for POE tap operation if the Poe supply is provided via only one of the network ports A and B. Also, though it is shown here, it is not necessary for the POE tap to employ a redundant external power link 230.

Figure 3B:
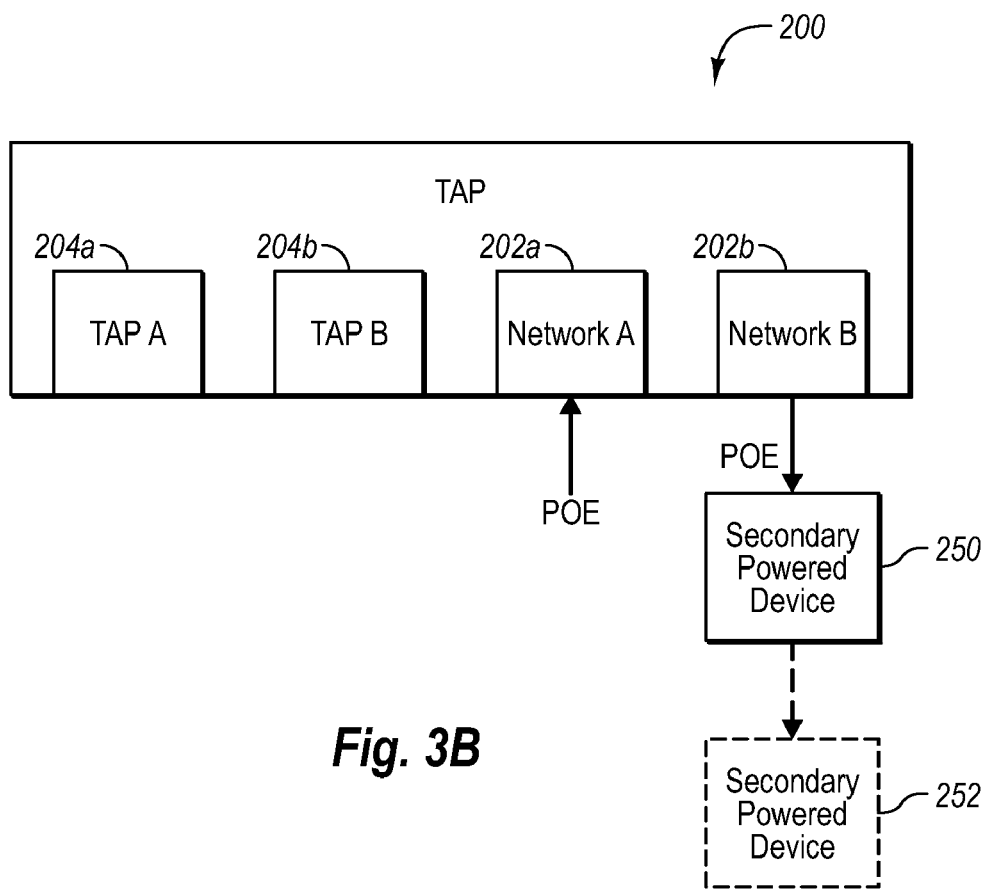

FIG. 3B, the POE tap 200 is configured such that not only is the POE supply received by the POE tap via network port A to enable tap operation, but that a portion of the POE supply is also forwarded to other network components that are downstream from the POE tap. In other words a supply "pass-through" is established, wherein the POE supply, in addition to powering the POE tap, is passed from one side of the computer network 100 to the other network side, via the POE tap. So configured, the POE tap 200 itself becomes a power sourcing equipment device, i.e., a power distribution node for downstream components.

In particular, the POE supply is shown in FIGS. 3 entering the POE tap 200 via network port A, where a portion of the supply is used to power the POE tap itself. As typically there remains sufficient excess power, the remaining POE supply is forwarded downstream via network port B to a secondary powered device 250, where the POE supply is employed to power that device. Depending on the amount of POE supply available, and the power requirements of each device, multiple secondary powered devices can be powered by the POE supply passed through by the POE tap 200, as indicated in phantom by secondary powered device 252. In this way, a "daisy chain" of POE supplied devices is created via the POE tap 200. In order for such a chain to be established however, the "power sourcing equipment," or the network component supplying the POE supply to the POE tap 200—such as the switch 104 shown in FIG. 1, for example—must transmit a sufficiently strong POE supply to enable the POE tap and all other downstream devices—known as "powered devices"—to be properly powered. If not, one or more of the powered devices may not be powered by POE supply, and must be equipped with an alternative power source.

When used itself as power sourcing equipment for the pass-through of POE supply, the POE tap 200 can employ its microcontroller 224 to evaluate whether or not the various end users of the POE supply passing through the tap can all be adequately supplied. This programming may involve the use of various protocols or priority schemes, so that some end users may receive both power and data by way of the POE tap 200, while other end users may receive only the data stream by way of the POE tap, owing to the fact that insufficient POE supply exists for powering all devices downstream. The microcontroller 224 can be further employed to establish a hierarchy as to which devices have priority when it comes to distributing POE supply. Note also, that in one embodiment one or more of the secondary powered devices can themselves be POE taps.

One exemplary application in which the configuration shown in FIG. 3B can be employed is in the field of voice over internet protocol ("VOIP"). VOIP phones often draw their power from a POE supply. As such, these phones and other VOIP-related devices can be powered using a pass-through POE supply from the POE tap 200. At the same time, the POE tap 200 can be employed with the VOIP phone to monitor its operation, if desired. In this way, neither the VOIP phone nor the POE tap are limited by traditional external power supplies.

Figure 3C:
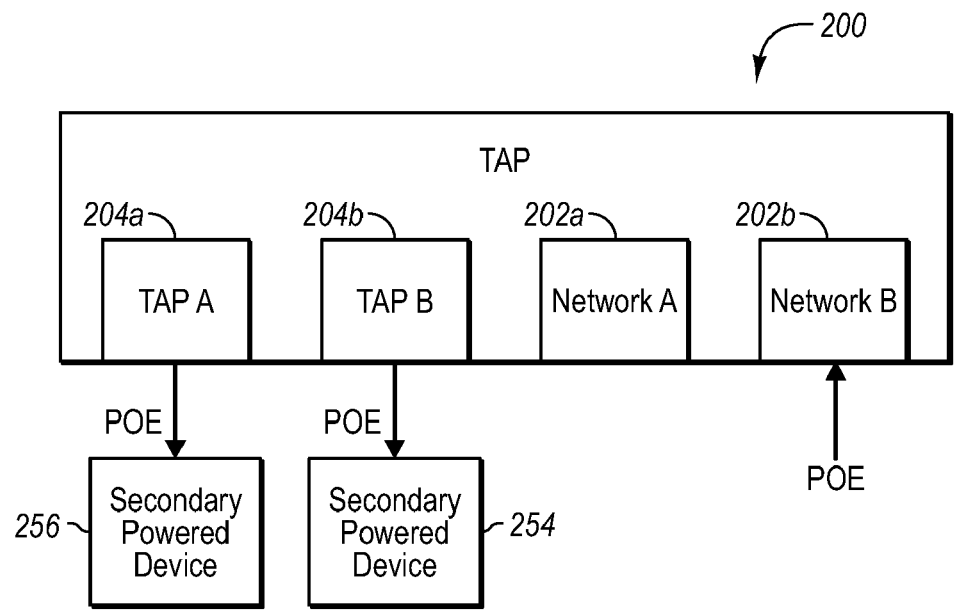

FIG. 3C illustrates yet another possible implementation, wherein the POE supply is provided from the computer network 100 via the network port B and, in addition to powering the POE tap 200 itself, the POE supply is passed through to one or more secondary powered devices 254 and 256. In contrast to the previous embodiment shown in FIG. 3B, the secondary powered devices 254 and 256 receive the POE supply via one or both of the Tap A and Tap B ports. As such, one or both secondary powered devices 254 and 256 can represent a monitoring device, such as that shown at 110 in FIG. 1. Alternatively, the secondary powered device 254 and 256 can be a handheld monitor or other device that can be powered by a POE supply.

Figure 3D:
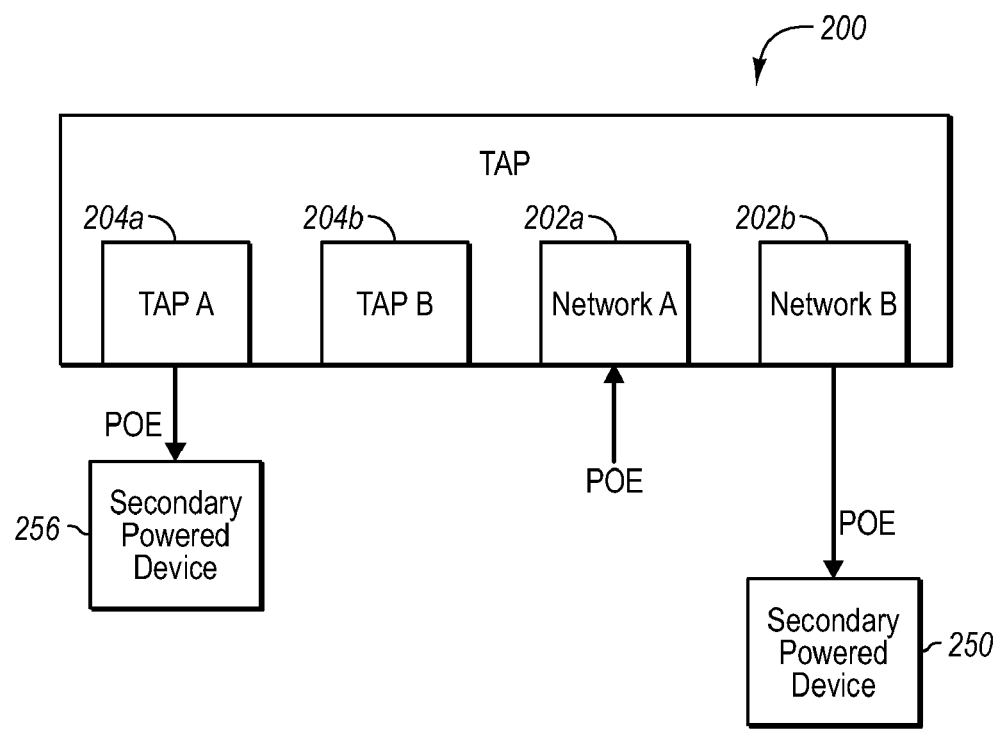

FIG. 3D represents yet another possible implementation, wherein certain elements of the embodiments shown in FIGS.

3B and 3C are combined. In particular, a POE supply is provided to the POE tap 200 via network port A. Pass-through POE supplies are also distributed by the POE tap 200 to the secondary powered device 250 via the network port B, and to the secondary powered device 256 via the tap A port. Note that the selection of the particular network and tap port is arbitrary.

As discussed, some embodiments of the POE tap are employed in a stand-alone configuration, wherein the POE tap obtains data from the network and then passes the data to a remote, or external, monitoring device such as an analyzer, bit error rate tester ("BERT") and/or other device. In yet other implementations however, the POE tap is incorporated into another device, such as a portable analyzer for example. Thus, embodiments of the invention embrace portable analyzers and other devices that incorporate a POE tap. In still further embodiments, a group of POE network taps are incorporated together into a bank, block or similar configuration so that the network data stream can be tapped and directed to multiple devices by way of respective POE network taps. Such banks or blocks can be configured in serial or parallel fashion.

The present invention may be embodied in other specific forms without departing from its spirit or essential characteristics. The described embodiments are to be considered in all respects only as illustrative, not restrictive. The scope of the invention is, therefore, indicated by the appended claims rather than by the foregoing description. All changes that come within the meaning and range of equivalency of the claims are to be embraced within their scope.

What is claimed is:

1. A network tap device powered by a power-over-Ethernet supply, comprising:
   first and second network ports configured to operably connect with communication cables, the communication cables configured to carry data signals to and from the network tap device, the communication cables further configured to carry a power-over-Ethernet supply;
   first and second tap ports configured to operably connect with communication cables, the communication cables configured to carry data signals and a portion of the power-over-Ethernet supply to at least one connected device; and
   control and regulation circuitry that is configured to receive the power-over-Ethernet supply from at least one of the communication cables via the respective one of the first and second network ports, wherein the control and regulation circuitry enables components of the network tap device to be operated by the power-over-Ethernet supply, and wherein the control and regulation circuitry is configured to forward a portion of the power-over-Ethernet supply through at least one of the tap ports to the at least one connected device.

2. The network tap device as defined in claim 1, wherein the communication cables operably connected with the first and second network ports are CAT-5 communication cables, and wherein the power-over-Ethernet supply is carried by selected wire pairs of the CAT-5 communication cable.

3. The network tap device as defined in claim 2, wherein the first and second network ports and the first and second tap ports include RJ-45 receptacles.

4. The network tap device as defined in claim 1, wherein a plurality of magnetics modules are configured to receive the power-over-Ethernet supply from the first and second network ports.

5. The network tap device as defined in claim 1, wherein a portion of the power-over-Ethernet supply is forwarded from at least one of the network ports to at least one secondary device operably connected to the network tap device by a communication cable.

6. The network tap device as defined in claim 5, wherein the power-over-Ethernet supply powers all functions of the network tap device and at least a portion of the functions of the at least one secondary device.

7. The network tap device as defined in claim 1, wherein portions of the power-over-Ethernet supply are forwarded from at least one of the network ports and at least one of the tap ports to a plurality of secondary devices operably connected to the network tap device.

8. The network tap device as defined in claim 1, wherein loss of the power-over-Ethernet supply corresponds with loss of the data signals by the network tap device.

9. The network tap device as defined in claim 1, wherein the network tap device is configured for use in a copper Gigabit Ethernet communications network.

10. The network tap as defined in claim 1, wherein the at least one connected device is a single monitoring device.

11. In a network tap device including a plurality of network ports and a plurality of tap ports, a method for powering a network tap device, the method comprising:
    by one of the plurality of network ports, receiving a power-over-Ethernet supply into the network tap device;
    distributing the power-over-Ethernet supply to at least one component included in the network tap device; and
    distributing the power-over-Ethernet supply through one of the plurality of tap ports to at least one connected device operably connected to the network tap device by a communication cable.

12. The method for powering as defined in claim 11, wherein distributing the power-over-Ethernet supply further comprises:
    distributing the power-over-Ethernet supply such that all powered components in the network tap device are powered by the power-over-Ethernet supply.

13. The method for powering as defined in claim 11, further comprising:
    by control circuitry, regulating the power-over-Ethernet supply provided to the at least one component in the network tap device and to the at least one connected device.

14. The method for powering as defined in claim 13, further comprising:
    forwarding the power-over-Ethernet supply from the network port to a magnetics component of the network tap device; and
    forwarding the power-over Ethernet supply from the magnetics component to the control circuitry.

15. The method for powering as defined in claim 11, wherein the power-over-Ethernet supply is received into the network port via a communication cable operably connected to the network port.

16. The method for powering as defined in claim 11, further comprising:
    by a microcontroller, governing operation of powered components of the network tap device and governing distribution of power to the at least one connected device according to the availability of the power-over-Ethernet supply.

17. The method for powering as defined in claim 11, wherein the power-over-Ethernet supply is shared between the network tap device and at least one other device that is operably connected to the network tap device by a communication cable.

18. A power-over-Ethernet-powered network tap device, comprising:
   first and second network ports having receptacles;
   first and second tap ports having receptacles;
   first and second magnetics modules operably connected to the first and second network ports, respectively; and
   control and regulation circuitry;
   wherein at least one of the first and second magnetics modules is configured to receive a power-over-Ethernet supply via at least one of the first and second network ports, and wherein the control and regulation circuitry governs use of the power-over-Ethernet supply to power components of the network device tap, and wherein the control and regulation circuitry is configured to forward a portion of the power-over-Ethernet supply through at least one of the first and second tap ports to power any monitoring devices connected to the at least one tap port via communication cables.

19. The network tap device as defined in claim 18, wherein the power-over-Ethernet supply is provided to the at least one of the first and second network ports by a communication cable that operably connects the network tap device to a communications network.

20. The network tap device as defined in claim 19, further comprising:
   a microcontroller that controls operation of at least some components of the network tap device that are powered by power-over-Ethernet.

21. The network tap device as defined in claim 20, wherein the microcontroller monitors temperature of the network tap device, and wherein the microcontroller controls operation of first and second relays of the network tap device.

22. The network tap device as defined in claim 21, wherein the microcontroller governs operation of first and second phy modules that are operably connected to the first and second magnetics modules.

23. The network tap device as defined in claim 22, further comprising a user interface that is configured to present data relating to the status of the power-over-Ethernet supply.

24. The network tap device as defined in claim 23, wherein the microcontroller governs use of the power-over-Ethernet supply by the network tap device and at least one other device that is operably connected to the network tap device by a communication cable.

25. The network tap device as defined in claim 24, further including a redundant external power supply.

26. The method for powering as defined in claim 13, further comprising:
   distributing the power-over-Ethernet supply through one of the plurality of network ports to at least one connected device operably connected to the network tap device by a communication cable,
   by the control circuitry, regulating the power-over-Ethernet supply provided to the at least one device connected to the network port,
   wherein regulating the power-over-Ethernet supply includes determining that sufficient power-over-Ethernet supply is available to distribute.

* * * * *